United States Patent [19]
Tanabe

[11] Patent Number: 5,426,642
[45] Date of Patent: Jun. 20, 1995

[54] SATELLITE BROADCAST COMMUNICATION SYSTEM

[75] Inventor: Naoto Tanabe, Kawasaki, Japan

[73] Assignee: Fujitsu Limited, Kawasaki, Japan

[21] Appl. No.: 932,809

[22] Filed: Aug. 20, 1992

[30] Foreign Application Priority Data

Aug. 26, 1991 [JP] Japan .................. 3-212520

[51] Int. Cl.$^6$ .............................................. H04J 3/06
[52] U.S. Cl. ................... 370/104.1; 370/95.3
[58] Field of Search .................. 370/104.1, 100.1, 103, 370/95.3, 99, 105.1, 105.4, 106, 108, 97, 95.1; 375/116, 114; 455/13.1, 51.1

[56] References Cited

U.S. PATENT DOCUMENTS

| | | | |
|---|---|---|---|
| 4,252,999 | 2/1981 | Acampora et al. | 370/97 |
| 4,506,383 | 3/1985 | McGann | 455/13.1 |
| 4,688,216 | 8/1987 | Saburi | 370/104.1 |
| 4,763,129 | 8/1988 | Perrotta | 370/95.3 |
| 4,774,708 | 9/1988 | Hotta | 370/95.3 |
| 5,128,971 | 7/1992 | Johnson | 455/51.1 |

*Primary Examiner*—Douglas W. Olms
*Assistant Examiner*—Dang Ton

[57] ABSTRACT

A satellite broadcast communication system which makes a communication via a communication satellite comprises N sub stations respectively assigned a time slot having a predetermined time width $T_0$, where N is an integer greater than one, and a main station including a broadcast part for broadcasting broadcast information to the N sub station via the communication satellite using a reference frame which has a time width $N \times T_0$, a part for receiving a reception acknowledge signal from the sub stations, and a part for setting a multi-frame to a predetermined value. The predetermined value is $M \times T_0$ when only M sub stations are subject to reception of the broadcast information, N/M is an integer and $M \leq N$, and the predetermined value is $M_1 \times T_0$ when only M sub stations are subject to reception of the broadcast information, N/M is not an integer and $M_1$ is an integer greater than M. Each of the N sub stations include a transmitting part for transmitting the reception acknowledge signal to the main station using the multi-frame which is set in the main station in response to the broadcast information which is received from the main station and is intended for the sub station to which the transmitting part belongs.

11 Claims, 9 Drawing Sheets

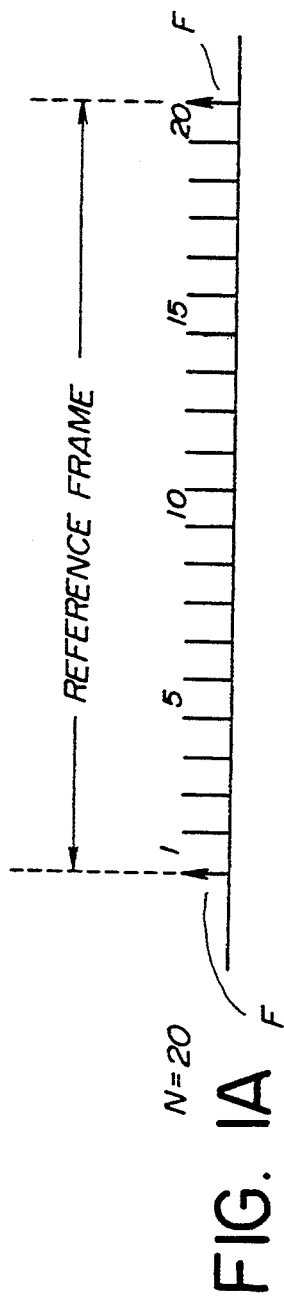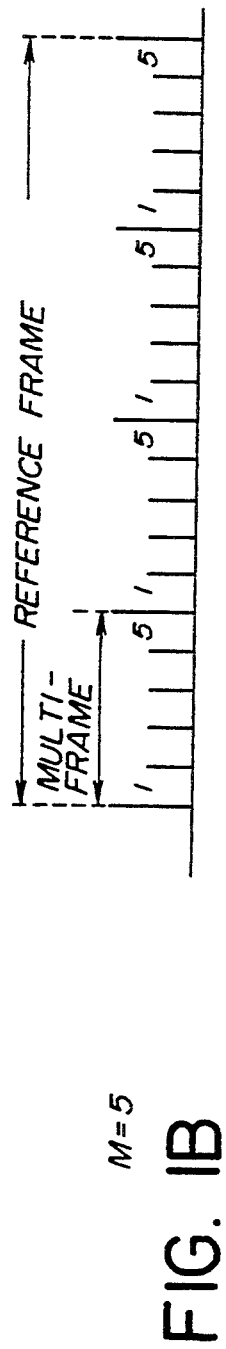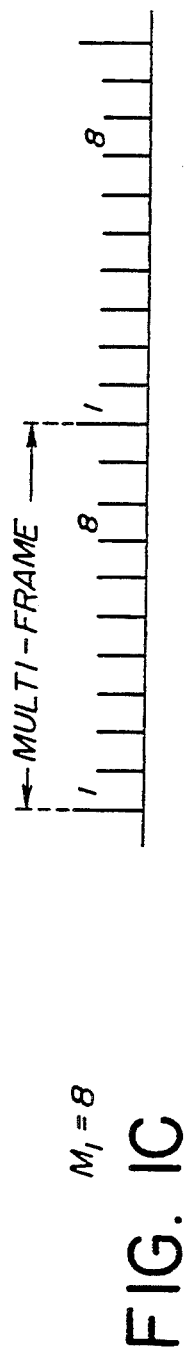
FIG. 1A
FIG. 1B
FIG. 1C

FIG.6

| GROUP NUMBER | MULTI-FRAME NUMBER | NUMBER OF BROADCAST STATIONS | SUB STATION NUMBER TO TRANSMIT RECEPTION ACKNOWLEDGE SIGNAL ||||||
|---|---|---|---|---|---|---|---|
| | | | TS1 | TS2 | TS3 | ----- | TSn |
| G0 | 00 | ALL | 01 | 02 | 03 | ∼ | nn |
| G1 | 01 | 10 | 03 | 05 | 10 | ∼ | XX |
| G2 | 05 | 50 | 04 | 06 | 21 | ∼ | YY |
| | | | | | | | |
| Gn | XX | n | 08 | 07 | 25 | ∼ | ZZ |

SATELLITE BROADCAST COMMUNICATION SYSTEM

BACKGROUND OF THE INVENTION

The present invention generally relates to satellite broadcast communication systems, and more particularly to a satellite broadcast communication system which broadcasts information from a main station to a plurality of sub stations via a communication satellite and successively transmits the information while receiving reception acknowledge signals from each of the sub stations.

In the satellite broadcast communication system of the type described above, the going line from the main station to the sub station is generally a line of a continuous wave and the returning line from the sub station to the main station is generally a time-division multi access (TDMA) line or a random access line.

Because a large number of sub stations are set up over a large region, it is desirable that the sub station is easy to set up and has a small scale so that the cost of the system can be minimized.

Furthermore, in order to cope with the different weather conditions depending on the locations of the scattered sub stations and to avoid deterioration of the receiving condition at the main station due to the transmission power which is reduced to make the sub station small-scale, it is necessary for each sub station to transmit the reception acknowledge signal a plurality of times. Hence, it is desirable to minimize the time required for the main station to receive the reception acknowledge signal from the sub station.

In the conventional satellite broadcast communication system, one of the following two methods is employed.

According to a first method, a number of time slots equal to the number of sub stations are provided for the returning line from the sub station to the main station, and one time slot is fixedly assigned to each sub station so that the main station can positively receive the reception acknowledge signal from each sub station. In this case, each sub station returns the reception acknowledge signal using the time slot which is assigned thereto, and the main station selects only the desired reception acknowledge signal.

However, according to this first method, even if the broadcast communication is to be made with respect to a specific group of sub stations less than the total number of sub stations, each sub station belonging to this specific group can only make access to the time slot assigned thereto. As a result, the maximum time required for the main station to receive the reception acknowledge signal is (total number of sub stations)×(length of time slot), and there is a problem in that the time required for the main station to receive the reception acknowledge signal is long. In calculating the maximum time, the satellite delay time is omitted because it is common for all sub stations.

On the other hand, a second method makes the number of time slots of the returning line smaller than the number of sub stations belonging to a group. A random-number generator is provided in each sub station, and a time slot corresponding to the generated random number is used to transmit the reception acknowledge signal to the main station via the communication satellite.

But according to the second method, if the number of sub stations belonging to the group is large or the broadcast communication is to be made with respect to all of the sub stations, the collision rate of the reception acknowledge signals transmitted from the sub stations increases at the communication satellite. In order to avoid the high collision rate, the range of the random number which determines the time slot of each sub station must be enlarged. As a result, there is a problem in that the time required for the main station to receive the reception acknowledge signal increases if the range of the random number is increased.

SUMMARY OF THE INVENTION

Accordingly, it is a general object of the present invention to provide a novel and useful satellite broadcast communication system in which the problems described above are eliminated.

Another and more specific object of the present invention is to provide a satellite broadcast communication system which makes a communication via a communication satellite, comprising N sub stations respectively assigned a time slot having a predetermined time width $T_0$, where N is an integer greater than one, and a main station including broadcast means for broadcasting broadcast information to the N sub station via the communication satellite using a reference frame which has a time width $N \times T_0$, means for receiving a reception acknowledge signal from the sub stations, and means for setting a multi-frame to a predetermined value, where the predetermined value is $M \times T_0$ when only M sub stations are subject to reception of the broadcast information, N/M is an integer and $M \leq N$, and the predetermined value is $M_1 \times T_0$ when only M sub stations are subject to reception of the broadcast information, N/M is not an integer and $M_1$ is an integer greater than M and closest to M. Each of the N sub stations include transmitting means for transmitting the reception acknowledge signal to the main station using the multi-frame which is set in the main station in response to the broadcast information which is received from the main station and is intended for the sub station to which the transmitting means belongs. According to the satellite broadcast communication system of the present invention, it is possible to effectively reduce the time required for the main station to obtain the reception acknowledge signals from the sub stations.

Still another object of the present invention is to provide a satellite broadcast communication system which makes a communication via a communication satellite, comprising a main station including first means for generating broadcast information and a group table, and second means, coupled to the first means, for storing the group table and for transmitting the group table to each sub station prior to broadcasting the broadcast information, the group table including, for each kind of broadcast information, a group number of each group of sub stations subject to reception, a number of sub stations subject to reception, and sub station numbers of sub stations which are to transmit a reception acknowledge signal written in a sequence of time slots, and a plurality of sub stations respectively including third means for storing at least a part of the group table received from the main station and related to the sub station to which the third means belongs, and fourth means, coupled to the third means, for generating timing information based on information which is required to generate a multi-frame and is received from the third means, where the first means of the main station notifies the second means and each of the sub stations a group number of selected sub stations subject to reception prior to broadcasting the broadcast information using a reference frame when broadcasting the broadcast information to the selected sub stations, and the third means of each of the sub stations generates the reception acknowledge signal based on whether or not the broadcast information is normally received from the main station, and transmits the reception acknowledge signal to the main station via the communication satellite in a time slot specified by at least the part of the group table stored therein using the timing information from the fourth means. According to the satellite broadcast communication system of the present invention, it is possible to effectively reduce the time required for the main station to obtain the reception acknowledge signals from the sub stations.

Other objects and further features of the present invention will be apparent from the following detailed description when read in conjunction with the accompanying drawings.

BRIEF DESCRIPTION OF THE DRAWINGS

FIG. 1 is a diagram for explaining the operating principle of a first aspect of the present invention;

FIG. 6 shows an embodiment of a group table;

DESCRIPTION OF THE PREFERRED EMBODIMENTS

First, a description will be given of the operating principle of first and second aspects of the present invention, by referring to FIGS. 1 and 2. FIG. 1 is a diagram for explaining the first aspect of the present invention, and FIG. 2 is a system block diagram for explaining the second aspect of the present invention.

Figure 2:
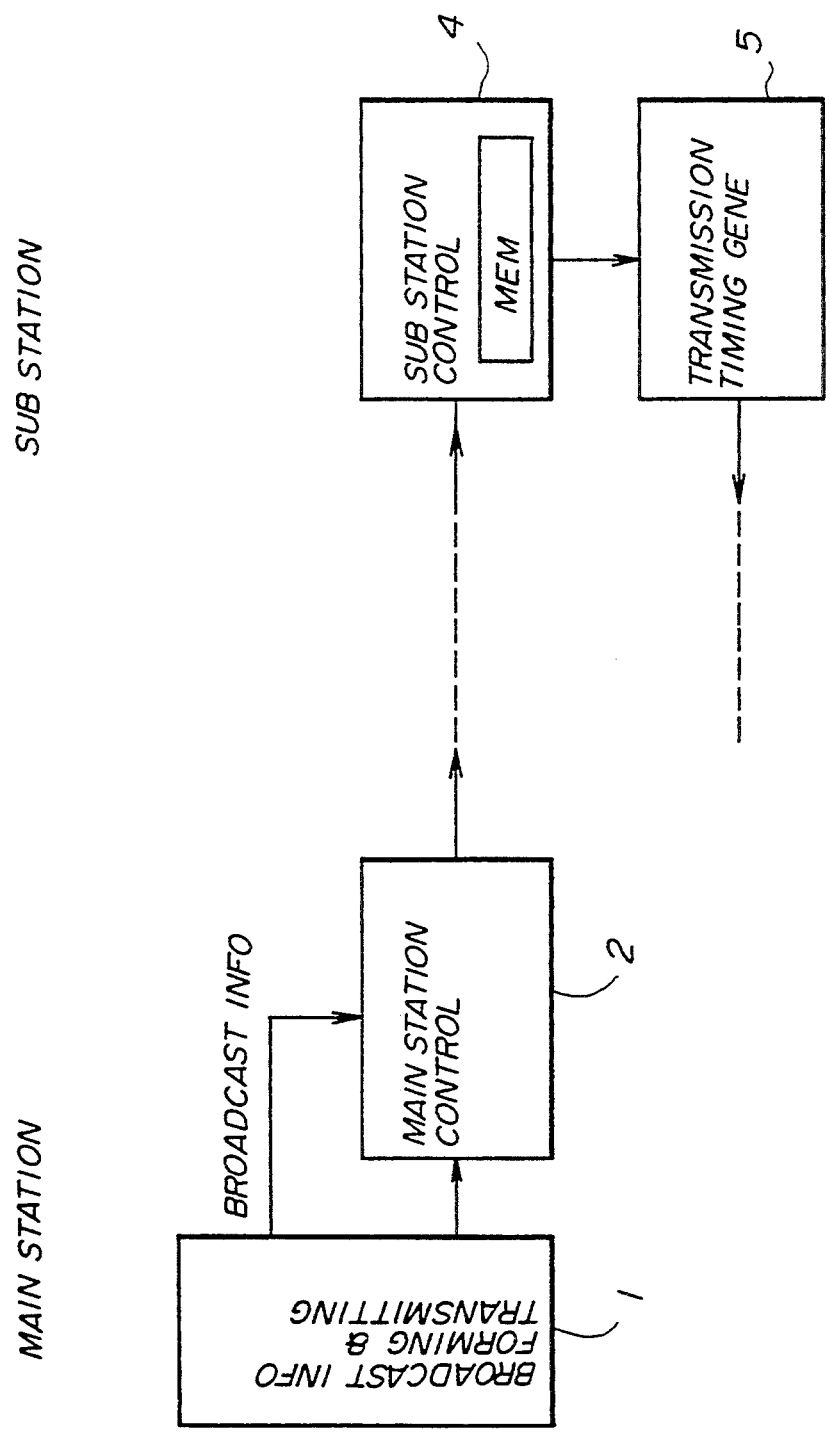
FIG. 2 is a system block diagram for explaining the operating principle of a second aspect of the present invention.

In FIG. 2, a main station includes a broadcast information forming and transmitting means 1 and a main station control means 2, while a sub station includes sub station control 4 and a transmission timing generation means 5. The broadcast information forming and transmitting means 1 forms a group table which includes group numbers of sub station groups corresponding to the kinds of broadcast information and are subject to reception, the number of sub stations subject to reception, and the sub station numbers of the sub stations which are to transmit reception acknowledge signals which are written according to the time slot sequence.

The main station control means 2 stores the group table in an internal memory thereof, and transmits the group table to all of the sub stations. On the other hand, the sub station control means 4 extracts only a part of the received group table related to the sub station to which this sub station control means 4 belongs, and stores the extracted part in an internal memory of the sub station control means 4. The sub station control means 4 also supplies information which is required to generate a multi-frame to the transmission timing generation means 5.

According to the first aspect of the present invention, if there are M sub stations which are subject to reception of the broadcast information, the main station sets one multi-frame to $M \times T_0$ when N/M is an integer and sets one multi-frame to $M_1 \times T_0$ if N/M is not an integer, where $T_0$ is the time width of the time slot TS and $M_1$ is an integer which is greater than M and is closest to M so that $N/M_1$ becomes an integer. Each sub station which are subject to reception of the broadcast information transmits the reception acknowledge information to the main station using the multi-frame which is set in the above described manner.

On the other hand, according to the second aspect of the present invention, when starting the broadcast of the broadcast information with respect to a specified group of sub stations, the main station notifies the subject group number to the main station control means 2 and the sub stations. Thereafter, the broadcast information is broadcast to the sub stations via the broadcast information forming and transmitting means 1 using a reference frame. At the sub station which is subject to reception, the received broadcast information is extracted and a normal reception is notified to the sub station control means 4. The sub station control means 4 generates the reception acknowledge signal based on this notification, and inserts the reception acknowledge signal into a time slot TS which is specified by the group table using transmission timing information which is generated by the transmission timing generation means 5. The reception acknowledge signal in the specified time slot TS is transmitted to the main station.

First, the main station inserts in the signal which is transmitted using the going line a reference frame identifier F at the start and end of a time width which is made up of N time slots TS which is equal to the number N of sub stations included in the satellite broadcast communication system, so as to notify all of the substations that the reference frame exists between two mutually adjacent reference frame identifiers F, as shown FIG. 1 (A). Hence, each sub station uses the received reference frame identifiers F to generate the reference frame for transmission in the transmission timing generation means 5.

According to the first aspect of the present invention, if there are M sub stations which are subject to reception of the broadcast information, the main station sets one multi-frame to $M \times T_0$ when N/M is an integer and sets one multi-frame to $M_1 \times T_0$ if N/M is not an integer, where $T_0$ is the time width of the time slot TS and $M_1$ is an integer which is greater than M and is closest to M so that $N/M_1$ becomes an integer, as described above. Each sub station which are subject to reception of the broadcast information transmits the reception acknowledge information to the main station using the multi-frame which is set in the above described manner.

Hence, if N=20 and M=5, for example, the time width of one multi-frame is set to 5 time slots TS because N/M=20/5=4 which is an integer. In this case, 4 multi-frames fit within one reference frame as shown in FIG. 1(B). On the other hand, if N=20 and M=8, for example, N/M is not an integer, so $M_1$ is set equal to 10. In this case, the time width of one multi-frame is set to 10 time slots TS, and 2 multi-frames fit within one reference frame as shown in FIG. 1(C).

Therefore, the multi-frame having 5 time slots TS is used to transmit the reception acknowledge signal if the number of sub stations subject to reception is 5, that is, M=5. On the other hand, the multi-frame having 10 time slots TS is used to transmit the reception acknowledge signal if M=8.

On the other hand, according to the second aspect of the present invention, when starting the broadcast of the broadcast information with respect to a specified group of sub stations, the main station notifies the subject group number to the main station control means 2 and the sub stations. Thereafter, the broadcast information is broadcast to the sub stations via the broadcast information forming and transmitting means 1 using the reference frame. At the sub station which is subject to reception, the received broadcast information is extracted and a normal reception is notified to the sub station control means 4. The sub station control means 4 generates the reception acknowledge signal based on this notification, and inserts the reception acknowledge signal into a time slot TS which is specified by the group table using transmission timing information which is generated by the transmission timing generation means 5. The reception acknowledge signal in the specified time slot TS is transmitted to the main station, as described above.

Therefore, the time required for the main station to receive the reception acknowledge signal can be reduced compared to the first and second conventional methods described above.

Figure 3:
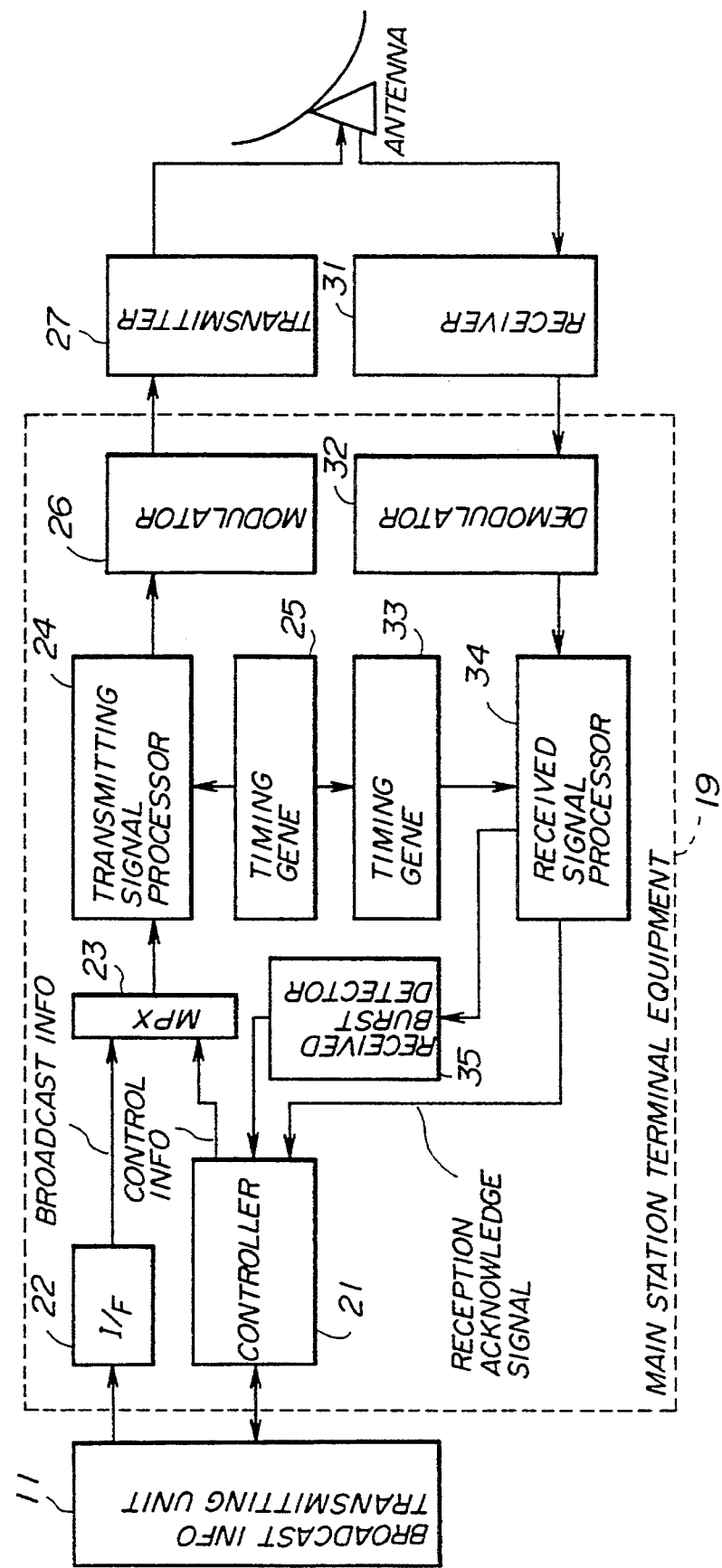
FIG. 3 is a system block diagram showing an embodiment of a main station which is employed in an embodiment of a satellite broadcast communication system according to the present invention.
Figure 4:
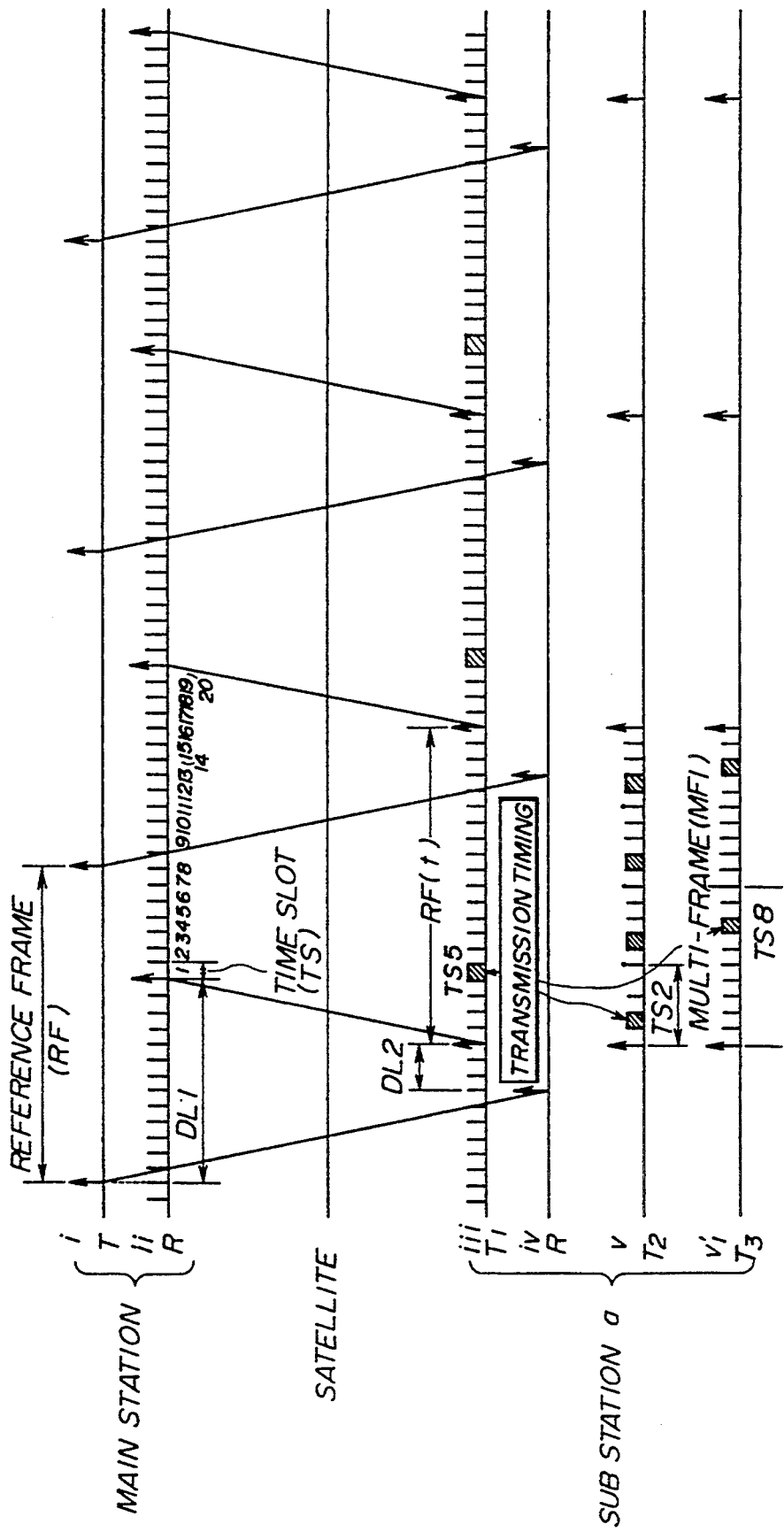
FIG. 4 is a time chart for explaining the operation timings of main and sub stations.
Figure 5:
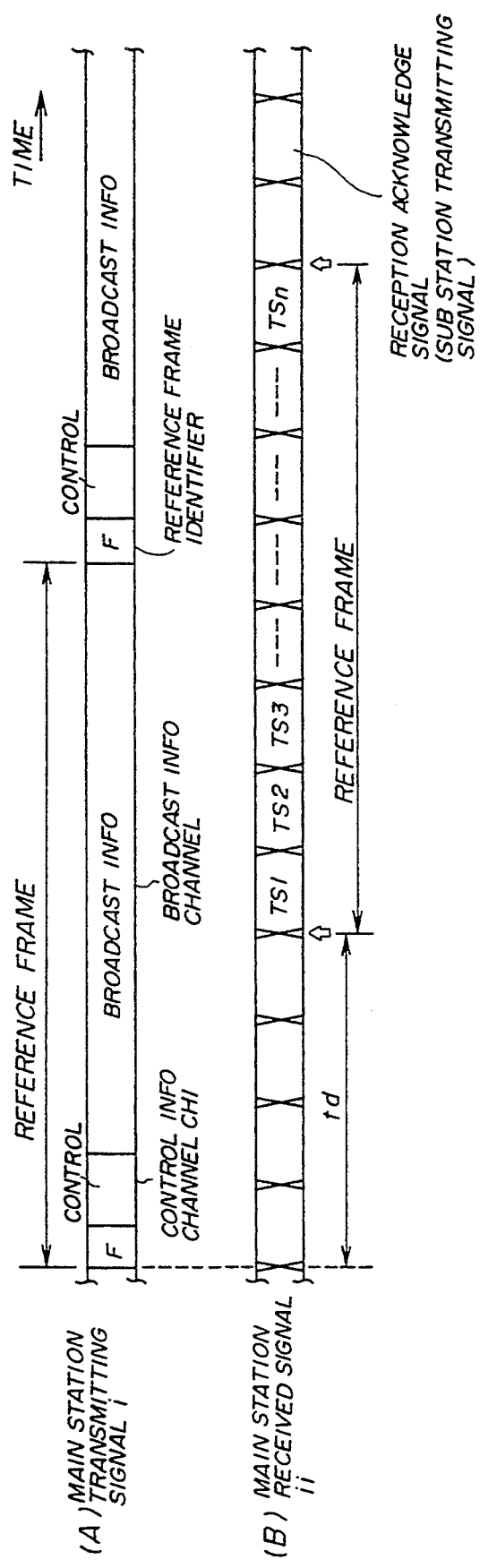
FIG. 5 is a diagram for explaining a frame format of transmitting and receiving signals at the main station.

Next, a description will be given of an embodiment of the satellite broadcast communication system according to the present invention, by referring to FIGS. 3 through 7. FIG. 3 shows an embodiment of the main station which is employed in this embodiment of the satellite broadcast communication system according to the present invention. FIG. 4 is a time chart for explaining the operation timings of main and sub stations. FIG. 5 is a diagram for explaining a frame format of transmitting and receiving signals at the main station. FIG. 6 shows an embodiment of a group table. Further, FIG. 7 is a system block diagram showing an embodiment of the sub station which is employed in this embodiment of the satellite broadcast communication system according to the present invention.

The main station of the satellite broadcast communication system shown in FIG. 3 includes a broadcast information transmitting unit 11, a main station controller 21, an input interface 22, a multiplexer 23, a transmitting signal processor 24, a transmission timing generator 25, a modulator 26, a transmitter 27 which is coupled to an-antenna, a receiver 31 which is coupled to the antenna, a demodulator 32, a reception timing generator 33, a received signal processor 34, and a received burst detector 35.

The broadcast information transmitting unit 11 shown in FIG. 3 corresponds to the broadcast information forming and transmitting means 1 shown in FIG. 2. The main station controller 21, the input interface 22, the multiplexer 23, the transmitting signal processor 24, the transmission timing generator 25, the modulator 26 and the transmitter 27 shown in FIG. 3 correspond to the main station control means 2 shown in FIG. 2.

Figure 7:
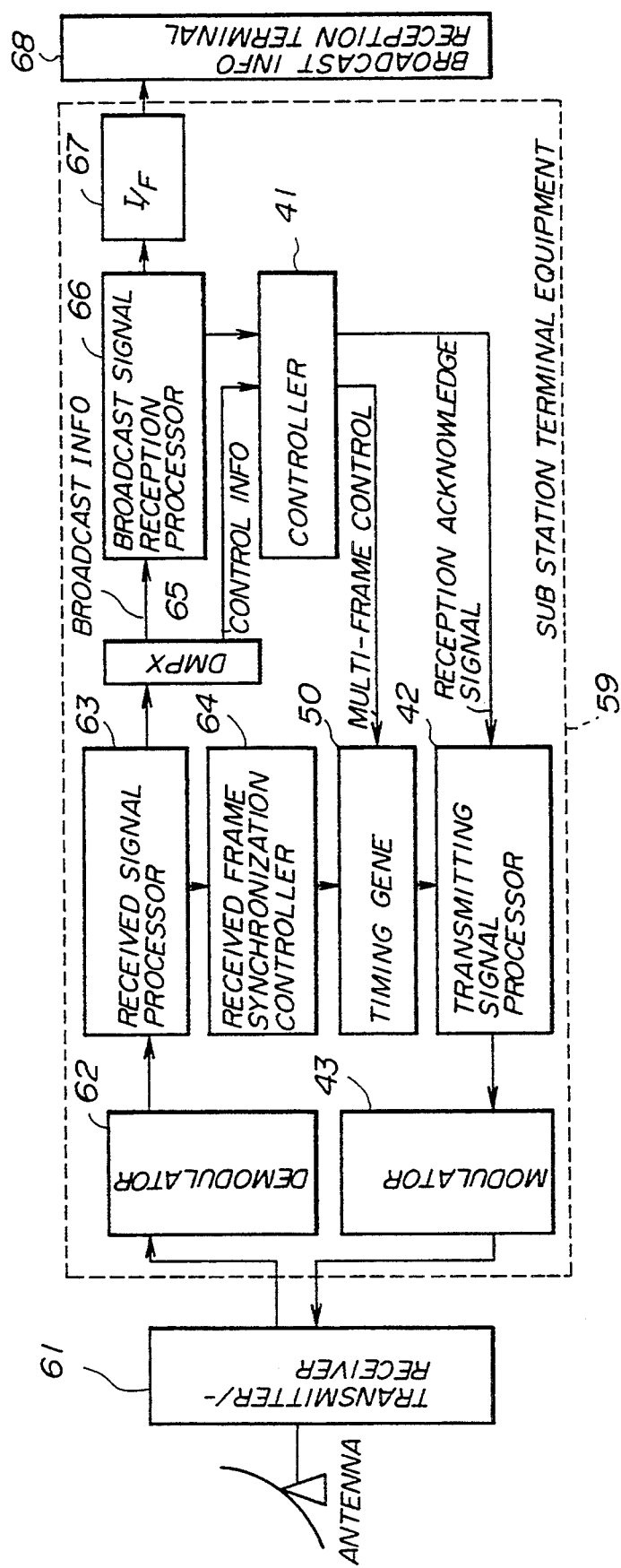
FIG. 7 is a system block diagram showing an embodiment of the sub station which is employed in the embodiment of the satellite broadcast communication system according to the present invention.

On the other hand, the sub station of the satellite broadcast communication system shown in FIG. 7 includes a transmitter/receiver 61 which is coupled to an antenna, a demodulator 62, a received signal processor 63, a received frame synchronization controller 64, a demultiplexer 65, a broadcast signal reception processor 66, an output interface 67, a broadcast information reception terminal 68, a sub station controller 41, a transmitting signal processor 42, a modulator 43, and a transmission timing generator 50.

The sub station controller 41, the transmitting signal processor 42 and the modulator 43 shown in FIG. 7 correspond to the sub station control means 4 shown in FIG. 2. The transmission timing generator 50 shown in FIG. 7 corresponds to the transmission timing generation means 5 shown in FIG. 2.

First, a description will be given of the functions of the parts in FIGS. 3 and 7 which are directly related to the present invention.

Functions of the Main Station (FIG. 3):

(a) The broadcast information transmitting unit 11 controls the functions of the entire main station when broadcasting the broadcast information. For example, the broadcast information transmitting unit 11 decides whether or not to re-transmit the broadcast information depending on the response from the substation, decides whether or not to advance to a subsequent step, and decides whether or not the operation should be ended. In addition, the broadcast information transmitting unit 11 updates the grouping of the sub stations, and forms the group table.

(b) The input interface 22 carries out a level conversion between the broadcast information transmitting unit 11 and a main station terminal equipment 19 which is indicated by a dotted line in FIG. 3.

(c) The multiplexer 23 multiplexes the broadcast information and control information.

(d) The transmitting signal processor 24 carries out a signal processing on the input signal, including scrambling, adding error correction code, and adding the reference frame identifier F.

(e) The transmission timing generator 25 generates the reference frame for transmission and the time slot TS.

(f) The reception timing generator 33 generates the reference frame identifier F for reception from the reference frame identifier F for transmission.

(g) The received signal processor 34 carries out a signal processing complementary to that of the transmitting signal processor 24 with respect to the information in each slot, by taking the reference frame identifier F for reception as a reference.

(h) The received burst detector 35 detects information added to a head of the burst, detects whether or not the burst is correctly received. The output of the received signal processing part 34 controls the input to the main station controller 21 depending on the detection result of the received burst detector 35.

(i) The main station controller 21 operates under control of the broadcast information transmitting unit 11, and carries out processes including forming of the format of the control information, controlling transmission of the control information, and collecting and processing the reception acknowledge signals. For example, the collecting and processing of the reception acknowledge signals include making a majority operation and deciding whether or not the reception acknowledge signal is received.

(j) The modulator 26, the transmitter 27, the receiver 31 and the demodulator 32 are used to modulate a wave by the input signal, to transmit the modulated wave at predetermined frequency and power, to frequency-convert the received signal and to output the signal at a predetermined level, and to output a demodulated signal from the input received signal.

Functions of the Sub Station (FIG. 7):

(a) The received frame synchronization controller 64 extracts the reference frame identifier from the received signal and recovers the reference frame for reception.

(b) The transmission timing generator 50 generates the reference frame for transmission and the time slot TS of the multi-frame by use of the reference frame identifier F which is received from the received frame synchronization controller 64.

(c) The sub station controller 41 uses the control information from the demultiplexer 65 to count the time slots TS within the multi-frame and generates a reception response signal based on the reception state which will be described later.

(d) The demultiplexer 65 demultiplexes the output of the received signal processor 63 into the broadcast information and the control information. The demultiplexer 65 transmits the broadcast information to the broadcast signal reception processor 66, and transmits the control information to the sub station controller 41.

(e) The broadcast signal reception processor 66 extracts from the received broadcast information the information which is intended for the sub station to which this broadcast signal reception processor 66 belongs. The broadcast signal reception processor 66 transmits the extracted information to the output interface 67 and notifies the reception state.

(f) The demodulator 62, the received signal processor 63, the transmitting signal processor 42 and the modulator 43 function similarly to the corresponding parts of the main station shown in FIG. 3.

Next, a description will be given of the operation of the main and sub stations shown in FIGS. 3 and 7, by referring to FIG. 4 through 6.

At the start of the satellite broadcast communication or at the time of re-structuring the grouping of the sub stations, the broadcast information transmitting unit 11 shown in FIG. 3 forms the group table of the sub stations subject to reception. More particularly, the operator manipulates a keyboard (not shown) or the like to generate the group table in the broadcast information transmitting unit 11, and notifies the group table to the main station controller 21. As shown in FIG. 6, the group table includes the group number, the multi-frame number, the number of sub stations to which the broadcast is to be made, and the number of the sub station which transmits the reception acknowledge signal (reception response signal) in the sequence of time slots TS.

The main station controller 21 stores the input group table in an internal memory (not shown), and downloads the group table to all of the substations via the multiplexer 23, the transmitting signal processor 24, the modulator 26 and the transmitter 27, using a control information channel CH1 shown in FIG. 5(A). In FIG. 5, F denotes the reference frame identifier, TS1 denotes the first time slot, and TS2 denotes the second time slot.

The sub station controller 41 shown in FIG. 7 extracts a part which is related to the sub station to which this sub station controller 41 belongs, out of the group table which is received via the transmitter/receiver 61, the demodulator 62, the received signal processor 63 and the demultiplexer 65. The sub station controller 41 stores the extracted part of the group table in an internal memory (not shown). At the same time, the sub station controller 63 transmits the information for generating the multi-frame to the transmission timing generator 50. For example, this information transmitted from the sub station controller 63 includes the multi-frame number, and the number of parts into which the reference frame is divided.

When broadcasting the broadcast information with respect to each group of sub stations, the broadcast information transmitting unit 11 of the main station notifies the group number to the main station controller 21 prior to broadcasting the broadcast information. When the broadcast information transmitting unit 11 notifies the group number, information indicating the number of time slots TS within one multi-frame is also notified to the main station controller 21. The main station controller 21 transfers the group table to each sub station using the control information channel CH1.

The transmission timing generator 50 of the sub station uses the information for generating the multi-frame from the sub station controller 41 and generates a corresponding multi-frame. Hence, the preparations are made to enable transmission of the reception acknowledge signal in a specified time slot TS of the generated multi-frame.

For example, the reference frame identifier F transmitted from the main station as indicated by i in FIG. 4 is obtained at the sub station after a predetermined time delay as indicated by iv in FIG. 4. The reference frame identifier is transmitted from the sub station to the main station after still another predetermined time delay, as indicated by iii in FIG. 4. The reference frame exists between the reference frame identifier F which is transmitted from the sub station and the next reference frame identifier F, but the time width of the reference frame is the same at the main and sub stations. In the case shown in FIG. 4, the reference frame is divided into 20 time slots TS.

The time width of the multi-frame is determined depending on the number of sub stations subject to reception, as described above. If the number of sub stations subject to reception is 5, one multi-frame is formed by 5 time slots TS and 4 multi-frames fit within the reference frame as indicated by v in FIG. 4. However, as indicated by vi in FIG. 4, one multi-frame is formed by 10 time slots TS and 2 multi-frames fit within the reference frame if the number of sub stations subject to reception is 8. In this latter case, 2 time slots TS are not used in each multi-frame.

The time width of the time slot TS is determined to a predetermined value. Hence, the transmission timing generator 50 uses an internal counter (not shown) to generate the transmission timing for transmitting the reception acknowledge signal in the specified time slot TS.

The broadcast information is supplied from the broadcast information transmitting unit 11 to the multiplexer 23 via the input interface 22, and is time-division-multiplexed with the control information. The output of the multiplexer 23 is scrambled, added with error correction code, and added with the reference frame identifier F in the transmitting signal processor 24. The output of the transmitting signal processor 24 is modulated by the modulator 26 and is transmitted to a satellite line with a format shown in FIG. 5(A).

In order to notify the sub station which has the power source turned ON after the satellite broadcast communication starts, the transmission of the group number is continued on the control information channel CH1 even after the broadcasting of the broadcast information starts.

The broadcast information is broadcast via the communication satellite is received and demodulated at each sub station. In the sub station, the received signal processor 63 carries out processes such as error correction decoding and de-scrambling. Thereafter, the broadcast information is demultiplexed from the control information by the demultiplexer 65, and is input to the broadcast signal reception processor 66.

The broadcast signal reception processor 66 checks whether or not the received broadcast information is to be output to the terminal side. The broadcast signal reception processor 66 outputs the normally received information to the broadcast information reception terminal 68 via the output interface 67, and at the same time, notifies the sub station controller 41 that the reception state is normal, for example.

When the reception state received from the broadcast signal reception processor 66 is normal, the sub station controller 41 forms the reception acknowledge signal and stores the reception acknowledge signal in a transmission buffer (not shown) within the transmitting signal processor 42. The transmission signal processor 42 transmits the reception acknowledge signal which is stored within the transmission buffer in the specified time slot TS under the control of the transmission timing generator 50 which determines the transmission timing.

As a result, as shown in FIG. 5(B), the receiver 31 of the main station receives in time division the reception acknowledge signals which are transmitted from the sub stations subject to reception.

The transmission of the reception acknowledge signal is continued until the main station specifies a new group number or instructs the stop of the transmission of the reception acknowledge signal.

In other words, by changing the frame structure of the returning line in correspondence with the number of sub stations subject to reception of the broadcast information from the main station, it is possible to reduce the time required for the main station to receive the reception acknowledge signal. In addition, if the number of sub stations subject to reception is relatively small, it is possible to increase the number of times the reception acknowledge signal is transmitted from each sub station within a predetermined time, and in this case, the reception acknowledge signal can be returned more positively. Moreover, by specifying the time slot TS in which the sub station is to return the reception acknowledge signal, it becomes possible for the main station to easily recognize which sub station has not returned the reception acknowledge signal even if a sub station becomes unable to transmit the reception acknowledge signal for some reason.

Figure 8:
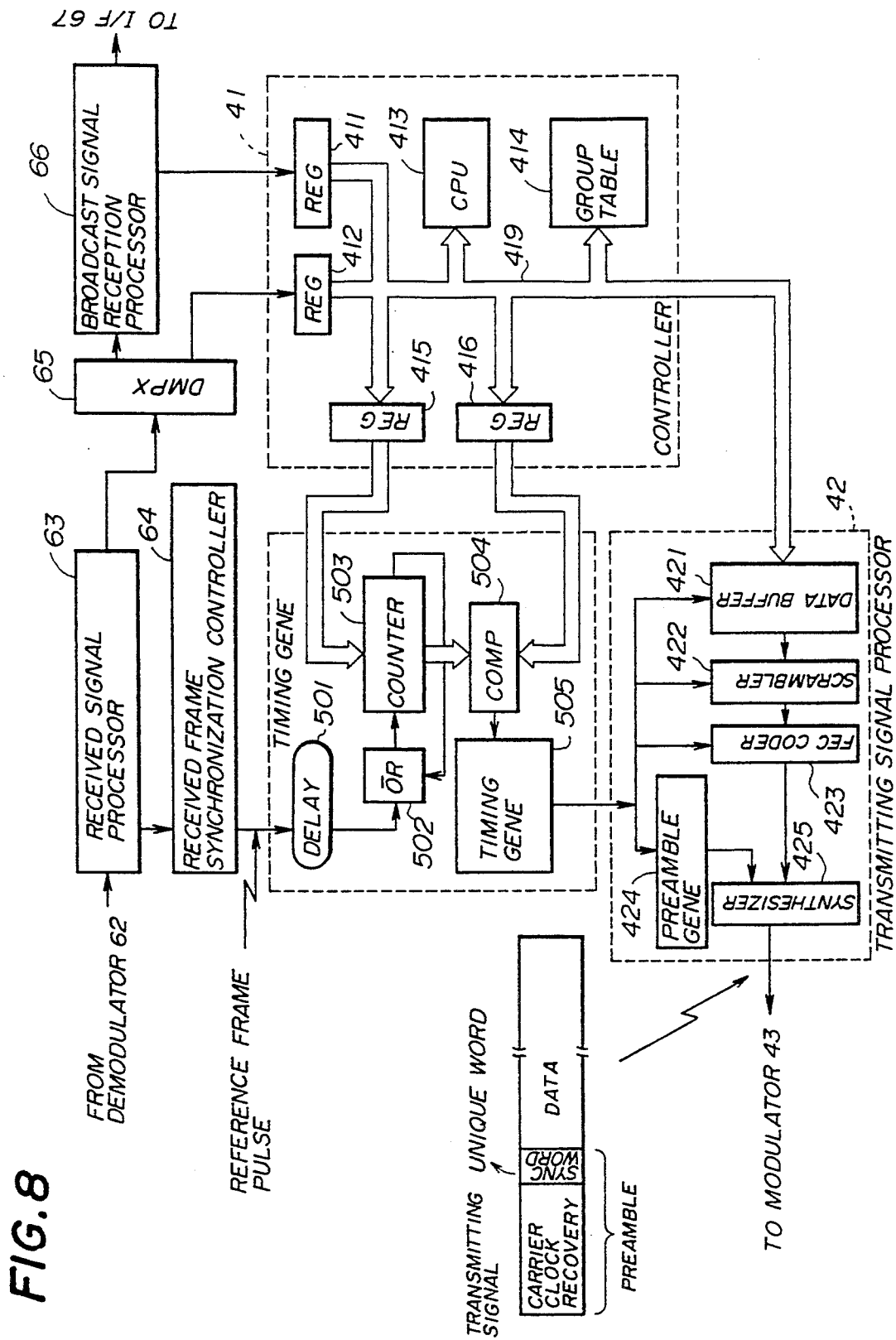
FIG. 8 is a system block diagram showing essential parts of the embodiment of the sub station in more detail.
Figure 9:
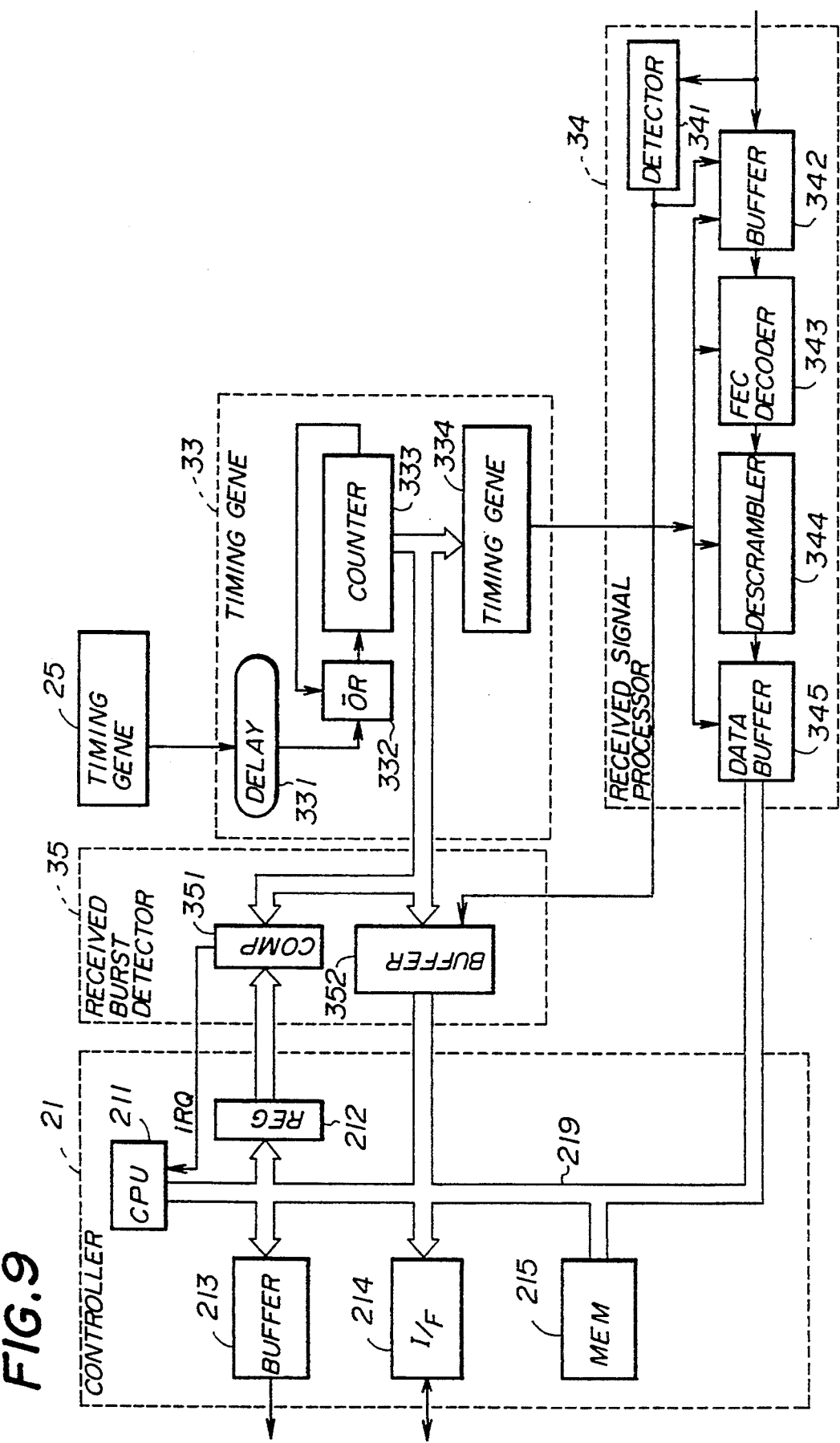
FIG. 9 is a system block diagram showing essential parts of the embodiment of the main station in more detail.

Next, a more detailed description will be given of the embodiments of the main and sub stations, in particular, the transmission timing of the sub station and the reception timing of the main station, by referring to FIGS. 8 and 9. FIG. 8 shows in more detail the sub station controller 41, the transmitting signal processor 42 and the transmission timing generator 50 of the sub station. FIG. 9 shows in more detail the main station controller 21, the reception timing generator 33, the received signal processor 34 and the received burst detector 35 of the main station. In FIGS. 8 and 9, those parts which are the same as those corresponding parts in FIGS. 7 and 3 are designated by the same reference numerals, and a description thereof will be omitted.

In FIG. 8, the sub station controller 41 of the sub station includes registers 411 and 412, a central processing unit (CPU) 413, a group table 414, and registers 415 and 416 which are coupled via a bus 419. The transmitting signal processor 42 includes a transmitting data buffer 421, a scrambler 422, a forward error correction (FEC) coder 423, a preamble generator 424 and a synthesizer 425 which are coupled as shown. In addition, the transmission timing generator 50 includes a delay circuit 501, an OR circuit 502, a multi-frame counter 503, a comparator 504 and a transmission timing generating part 505 which are coupled as shown.

As shown in FIG. 8, the sub station controller 41 receives the control information from the main station via the demultiplexer 65 and sets the control information in the register 412. The signal reception result from the broadcast signal reception processor 66 is set in the register 411. The CPU 413 obtains from the group table 414 the number of time slots TS of the present multi-frame and the time slot position in which this sub station is to transmit the reception acknowledge signal, based on group number which is specified by the control information stored in the register 412. The number of time slots TS of the present multi-frame is set in the register 415, and the time slot position is set in the register 416 as the transmitting time slot number. In addition, the CPU 413 generates the reception acknowledge signal based on the signal reception result set in the register 411, and stores the reception acknowledge signal in the transmission data buffer 421 of the transmitting signal processor 42.

The multi-frame counter 503 of the transmission timing generator 50 operates at the multi-frame period specified by the number of time slots TS of the present multi-frame which is set in the register 415. The multi-frame counter 503 counts the reference frame pulse which is received from the received frame synchronization controller 64 via the delay circuit 501 and the OR circuit 502. The delay circuit 501 provides a delay corresponding to a time D2 shown in FIG. 4. The OR circuit 502 also receives a carry output of the multi-frame counter 503. An output of the multi-frame counter 503 is compared in the comparator 504 with the transmitting time slot number which is set in the register 416.

The comparator 504 supplies a signal to the transmission timing generating part 505 to generate various timings only when the two values compared in the comparator 504 match. In response to the signal from the comparator 504, the transmission timing generating part 505 supplies to the transmitting signal processor 42 timing signals for determining various operation timings, including the read out timing of the transmission data buffer 421, the operation timings of the scrambler 422 and the FEC coder 423, the preamble generation timing of the preamble generator 424 and the like.

Based on the timing signals received from the transmission timing generating part 505, the reception acknowledge signal is read out from the transmission data buffer 421 of the transmitting signal processor 42 and is subjected to scrambling and FEC coding in the scrambler 422 and the FEC coder 423. Furthermore, the preamble from the preamble generator 424 is added to the reception acknowledge signal in the synthesizer 425, and the reception acknowledge signal is output to the modulator 43 shown in FIG. 7.

The FEC is normally used in satellite communication for the purpose of error correction. On the other hand, the preamble is used to receive the burst signal, and is made up of a carrier clock recovery part for the demodulator and a unique (synchronizing) word for specifying the head position of the data.

In FIG. 9, the main station controller 21 of the main station includes a CPU 211, a multi-frame register 212, a control information transmission buffer 213, a synchronizing information transmitting unit interface 214, and a work memory 215 which are coupled via a bus 219. The reception timing generator 33 includes a delay circuit 331, an OR circuit 332, a received reference frame counter 333 and a reception timing generating part 334 which are coupled as shown. The received signal processor 34 includes a unique word detector 341, a clock conversion buffer 342, a FEC decoder 343, a descrambler 344 and a reception data buffer 345 which are coupled as shown. The received burst detector 35 includes a comparator 351 and a received burst detection buffer 352 which are coupled as shown.

As shown in FIG. 9, the reception acknowledge signal which is received from the sub station in the burst form is input to the received signal processor 34 via the receiver 31 and the demodulator 32 shown in FIG. 3. The unique word detector 341 of the received signal processor 34 detects the unique word of the reception acknowledge signal and determines the head of the data part. The received data is stored in the clock conversion buffer 342. On the other hand, if no unique word is detected by the unique word detector 341, it is regarded that there is a detection error and no data storage into the clock conversion buffer 342 is made.

In addition, the result of the detection may in the unique word detector 341 is written into the received burst detection buffer 352 of the received burst detector 35 for every time slot TS by taking an output of the received frame counter 333 as the address. In the reception timing generator 33, the received reference frame counter 333 counts the reference frame pulse which is received from the transmission timing generator 25 via the delay circuit 331 and the OR circuit 332. The delay circuit 331 provides a delay corresponding to a time DL1 shown in FIG. 1. The OR circuit 332 also receives a carry (or overflow) signal of the received reference frame counter 333. The reception timing generating part 334 generates timing signals for determining various operation timings of the received signal processor 34 based on the output of the received reference frame counter 333.

The received data stored in the clock conversion buffer 342 is read out depending on the reference frame timing of the main station, and is subjected to a FED decoding and descrambling in the FEC decoder 343 and the descrambler 344 before being stored in the reception data buffer 345. The transmission burst clock of each sub station synchronized to the transmission clock of the main station includes a fluctuation caused by a positional change and the like of the satellite, and the clock conversion is made at the clock conversion buffer 342 so as to eliminate the fluctuation.

The CPU 211 of the main station controller 21 sets in the multi-frame register 212 the time slot number within the reference frame corresponding to the number of time slots TS of the present multi-frame. The comparator 351 of the received burst detector 35 compares the time slot number received from the multi-frame register 212 and the output of the received reference frame counter 333 of the reception timing generator 33, and generates an interrupt iRQ with respect to the CPU 211 to notify the end of the multi-frame when the two compared values match. Of course, the comparison of the time slots TS of the multi-frame made in the comparator 351 may be made similarly as in the sub station.

If N=20 and M=5, for example, the CPU 211 first sets "5" in the multi-frame register 212 and thereafter sets "10" in the multi-frame register 212 after the interrupt iRQ. he 211 reads out the contents of the reception data buffer 345 of the received signal processor 34 and the received burst detection buffer 352 of the received burst detector 35 for every interrupt iRQ, and makes a decision on re-transmission, continue transmission and the like. At the same time, the CPU 211 carries out the process of updating the content of the multi-frame register 212.

The work memory 215 is used by the CPU 211. The control information transmission buffer 231 is coupled to the multiplexer 23 shown in FIG. 3 and transmits the control information thereto. Further, the broadcast information transmitting unit interface 214 is coupled to the broadcast information transmitting unit 11 shown in FIG. 3 and transmits the broadcast information thereto.

Further, the present invention is not limited to these embodiments, but various variations and modifications may be made without departing from the scope of the present invention.

What is claimed is:

1. A satellite broadcast communication system which makes a communication via a communication satellite, said satellite broadcast communication system comprising:

N sub stations respectively assigned a time slot having a predetermined time width $T_0$, where N is an integer greater than one; and a main station including broadcast means for broadcasting broadcast information to said N sub stations via the communication satellite using a reference frame which has a time width $N \times T_0$, means for receiving a reception acknowledge signal from said sub stations, and means for dynamically setting a multi-frame to a predetermined value during operation of the system, wherein said predetermined value is $M \times T_0$ when only M sub stations are subject to reception of the broadcast information and N/M is an integer, where $M \leq N$, and said predetermined value is $M_1 \times T_0$ when only M sub stations are subject to reception of the broadcast information and N/M is not an integer, where $M_1$ is a smallest integer which is greater than M and $N/M_1$ is an integer, each of said N sub stations including transmitting means for transmitting the reception acknowledge signal to said main station using the multi-frame which is set in said main station in response to the broadcast information on a respective sub station of said N sub stations, said broadcast information being received from said main station.

2. The satellite broadcast communication system as claimed in claim 1, wherein said main station further includes means for transmitting a group table to each of said N sub stations prior to broadcasting the broadcast information, said group table including, for each kind of broadcast information, a group number of each group of sub stations subject to reception, a number of sub stations subject to reception, and sub station numbers of sub stations which are to transmit the reception acknowledge signal written in a sequence of the time slots.

3. The satellite broadcast communication system as claimed in claim 2, wherein said main station further includes means for generating and storing the group table.

4. The satellite broadcast communication system as claimed in claim 2, wherein each of said N sub stations further includes storing means for storing at least a part of the group table, said part including information on a respective sub station of said N sub stations and being received from said main station, and said transmitting means transmits the reception acknowledge signal in a time slot specified by at least the part of the group table stored in said storing means.

5. The satellite broadcast communication system as claimed in claim 4, wherein each of said N sub stations further include timing generation means for generating timing information based on information which is required to generate the multi-frame and is stored in said storing means, and said transmitting means transmits the reception acknowledge signal in the time slot specified by at least the part of the group table stored in said storing means using the timing information.

6. The satellite broadcast communication system as claimed in claim 2, wherein said broadcast means notifies each of said N sub stations the group number of selected sub stations subject to reception of the broadcast information prior to broadcasting the broadcast information to the selected sub stations.

7. The satellite broadcast communication system as claimed in claim 2, wherein said transmitting means of each sub station transmits the reception acknowledge signal based on whether or not the broadcast information from said main station is normally received.

8. A satellite broadcast communication system which makes a communication via a communication satellite, said satellite broadcast communication system comprising:

a main station including first means for generating broadcast information and a group table, and second means, coupled to said first means, for storing the group table and for transmitting the group table to each sub station prior to broadcasting the broadcast information, said group table including, for each kind of broadcast information, a group number of each group of sub stations subject to reception, a number of sub stations subject to reception, and sub station numbers of sub stations which are to transmit a reception acknowledge signal written in a sequence of time slots; and a plurality of sub stations each including third means for storing at least a part of the group table, said part including information on a respective sub station and being received from said main station, and fourth means, coupled to said third means, for generating timing information based on information which is required to dynamically generate a multi-frame during operation of the system and is received from said third means, said main station notifying each of said sub stations a group number of selected sub stations subject to reception prior to broadcasting the broadcast information using a reference frame when broadcasting the broadcast information to the selected sub stations, said third means of each of said sub stations generating the reception acknowledge signal based on whether or not the broadcast information is normally received from said main station, and transmitting the reception acknowledge signal to said main station via the communication satellite in a time slot specified by at least the part of the group table stored therein using the timing information from said fourth means.

9. The satellite broadcast communication system as claimed in claim 8, wherein N sub stations are respectively assigned a time slot having a predetermined time width $T_0$, where N is an integer greater than one, said first means of said main station broadcasts the broadcast information to said N sub stations via the communication satellite using a reference frame which has a time width $N \times T_0$.

10. The satellite broadcast communication system as claimed in claim 9, wherein said main station further includes means for receiving the reception acknowledge signal from said sub stations, and means for dynamically setting the multi-frame to a predetermined value, wherein said predetermined value is $M \times T_0$ when only M sub stations are subject to reception of the broadcast information and N/M is an integer, where $M \leq N$, and said predetermined value is $M_1 \times T_0$ when only M sub stations are subject to reception of the broadcast information and N/M is not an integer, where $M_1$ is a smallest integer which is greater than M and $N/M_1$ is an integer.

11. The satellite broadcast communication system as claimed in claim 10, wherein said third means of each of said sub stations includes means for transmitting the reception acknowledge signal to said main station using the multi-frame which is set in said main station in response to the broadcast information on a respective sub station, said broadcast information being received from said main station.

* * * * *